United States Patent [19]

Ahn

[11] Patent Number: 5,910,861
[45] Date of Patent: Jun. 8, 1999

[54] TECHNIQUE FOR CONTROLLING THE WRITE CURRENTS OF A MAGNETIC DISK RECORDING APPARATUS

[75] Inventor: Young-Sub Ahn, Suwon, Rep. of Korea

[73] Assignee: SamSung Electronics Co., Ltd., Suwon, Rep. of Korea

[21] Appl. No.: 08/781,982

[22] Filed: Dec. 27, 1996

[30] Foreign Application Priority Data

Dec. 27, 1995 [KR] Rep. of Korea ............ 95-59431

[51] Int. Cl.$^6$ .................. G11B 5/09; G11B 5/02
[52] U.S. Cl. ............................ 360/46; 360/67
[58] Field of Search ............... 360/46, 67–68, 360/51

[56] References Cited

U.S. PATENT DOCUMENTS

| | | | |
|---|---|---|---|
| 3,618,119 | 11/1971 | Rodriguez | 360/46 |
| 3,869,714 | 3/1975 | Schneider | 360/45 |
| 4,479,151 | 10/1984 | Lia et al. | 360/46 |
| 5,038,230 | 8/1991 | Kusunoki | 360/46 |
| 5,067,032 | 11/1991 | Ida | 360/46 |
| 5,097,348 | 3/1992 | Suetaka | 386/95 |
| 5,107,378 | 4/1992 | Cronch et al. | 360/65 |
| 5,168,395 | 12/1992 | Klaassen et al. | 360/46 |
| 5,305,106 | 4/1994 | Fukushima et al. | 348/521 |
| 5,307,214 | 4/1994 | Kawakami et al. | 360/61 |
| 5,331,479 | 7/1994 | Madsen | 360/68 |
| 5,359,467 | 10/1994 | Nakamura | 360/46 |
| 5,392,169 | 2/1995 | Argyle et al. | 360/45 |
| 5,392,172 | 2/1995 | Yoshinaga et al. | 360/67 |
| 5,436,772 | 7/1995 | Sekiya et al. | 360/66 |
| 5,461,517 | 10/1995 | Suda et al. | 360/53 |
| 5,483,390 | 1/1996 | Jaffard et al. | 360/62 |
| 5,485,320 | 1/1996 | Vogel et al. | 360/31 |
| 5,523,676 | 6/1996 | Bach et al. | 324/103 P |
| 5,781,362 | 7/1998 | Bang | 360/78.04 |

FOREIGN PATENT DOCUMENTS 0 357 889 A2   3/1990   European Pat. Off. .
0 455 438 A2  11/1991   European Pat. Off. .

OTHER PUBLICATIONS

Japanese Abstract (Dialog File) for JP 3–127303, Atsushi et al, May 30, 1991.

*Primary Examiner*—Aristotelis M. Psitos
*Assistant Examiner*—Regina Y. Neal
*Attorney, Agent, or Firm*—Robert E. Bushnell, Esq.

[57] ABSTRACT

A technique for controlling the write currents of a magnetic disk recording apparatus includes prolonging the write mode for a given time after completing data writing on a disk by supplying a constant write current to a head according to data to write, gradually reducing the write current for the given time, and cutting off the write current.

4 Claims, 7 Drawing Sheets

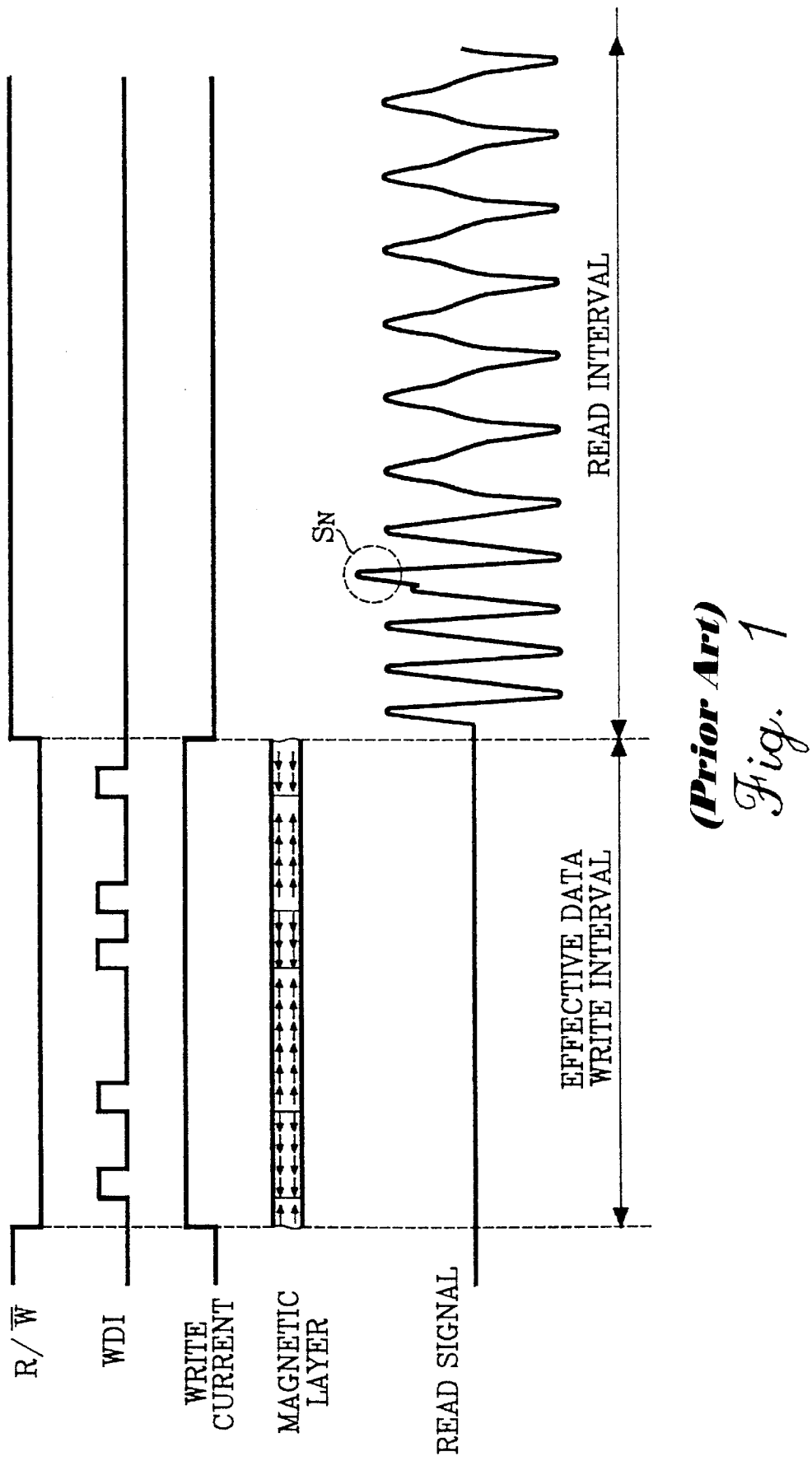
(Prior Art) Fig. 1

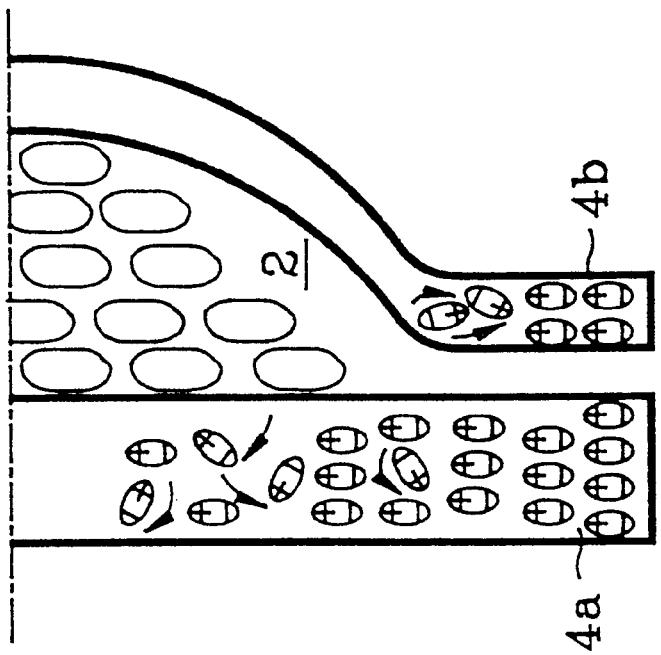
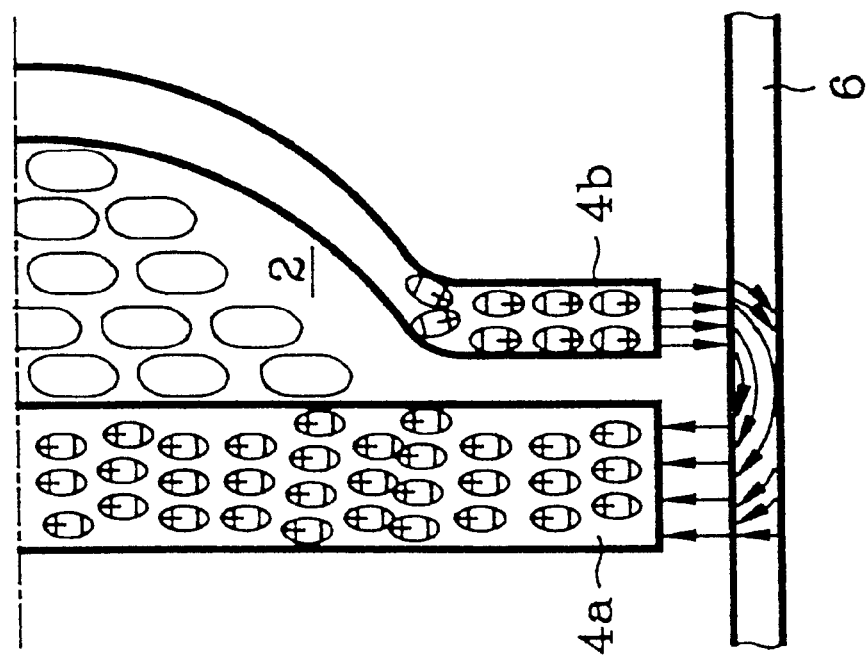
(Prior Art) Fig. 2A
(Prior Art) Fig. 2B

TECHNIQUE FOR CONTROLLING THE WRITE CURRENTS OF A MAGNETIC DISK RECORDING APPARATUS

This application makes claims all benefits accruing under 35 U.S.C. §119 from an application for CIRCUIT FOR CONTROLLING THE WRITE CURRENTS OF A MAGNETIC DISK RECORDING APPARATUS AND METHOD THEREFOR earlier filed in the Korean Industrial Property Office on Dec. 27, 1995 and there duly assigned Ser. No. 59431/1995.

BACKGROUND OF THE INVENTION

1. Field of the Invention

The present invention concerns a magnetic disk recording apparatus having magnetic heads for reading or writing data from or onto disks, and more particularly a technique for controlling the write currents supplied to magnetic heads to write data on the magnetic disks.

2. Description of the Related art

A magnetic disk recording apparatus such as hard disk drive (HDD) or a floppy disk drive (FDD), is generally used as an auxiliary memory device for a computer system. Especially, an HDD usually has a capacity to stably store a large amount of data and to make it possible to access stored data at a great speed. Since the write density of the magnetic disks of an HDD has continuously increased in order to increase the data storage capacity, the magnetic heads must be made with a high precision. To this end, the use of thin film heads has been increased in order to obtain a high data recording density. However, the thin film heads suffer from various problems connected with the characteristics of head poles. One of the typical problems is a phenomenon called "Barkhausen Noise", which is generated when an HDD transits from a writing phase to a reading phase; this noise is also called popcorn noise or wiggle noise.

The cause of such noise will be considered with reference to FIG. 1 for illustrating the writing operation timing according to a write control sequence used in HDDs, and to FIGS. 2A and 2B for illustrating a partial cross sectional view of a thin film head core to showing the changes of the magnetic polarity arrangement before and after cutting off the write current. In FIG. 1, reference numeral R/W represents a read/write mode signal, which is "high" in a read mode and "low" in a write mode. Reference numeral WDI represents encoded digital data recorded on a magnetic recording disk. The write current is supplied to the coil of a head according to the write digital data WDI, normally having a constant value. The disk is covered with a magnetic layer magnetized by the magnetic field generated by a head. A read signal is an analog signal picked up by a head from a disk in the read mode. In FIGS. 2A and 2B, reference numeral 2 indicates the coil of a head, which supplies the write current to the head to write data on a disk as shown in FIG. 2A. FIG. 2B illustrates the state of the head and the disk after cutting off the write current. Reference numerals 4a and 4b indicate magnetic poles, and the numeral 6 indicates the magnetic layer covering a disk.

In the write mode, an HDD supplies the write current to the coil of a head 2 according to the write data, so that the magnetic polarity elements of the magnetic poles 4a and 4b are arranged in a given direction, thereby producing a magnetic field, as shown in FIG. 2A. The magnetic field magnetizes the magnetic layer deposited on a magnetic recording disk 6 to write data. When the write current is cut off to end the data write mode, the regular arrangement of the magnetic polarity elements are broken due to an entropy increase as shown in FIG. 2B, thereby changing the magnetic field, which causes the Barkhausen noise to usually be prolonged for about 7 $\mu$s–10 $\mu$s until the head is stabilized.

Presently, the heads of an HDD are commonly used for both read and write operations. Hence, the Barkhausen noise is usually contained in the read signal picked up from a disk immediately after the HDD has transited from the write mode to the read mode. The Barkhausen noise is indicated by reference numeral $S_n$ in FIG. 1. Such noise distorts the waveform of the read signal causing data errors. The Barkhausen noise is always generated when a thin film head transits between the write and the read mode although the amount differs more or less according to the characteristics of the heads.

The Klaassen, et al. patent, U.S. Pat. No 5,168,395, discloses a current tapering circuit which gradually reduces the write current in a recording head with a ramp or decaying exponential termination. The technique shown in Klaassen et al. depends upon a monotonically decaying taper circuit having a time constant that is at least as long as a characteristic relaxation time of the domain walls in the driven magnetic recording head. However, Klaassen, et al. does not teach or suggest the specific features of the write current adjustments circuit of the present invention.

The following additional patents each disclose features in common with the present invention but are not believed to be as pertinent to as a Klaassen, et al. reference noted above: U.S. Pat. No. 5,067,032 to Ida, entitled Head Driver, U.S. Pat. No. 5,038,230 to Kusunoki et al., entitled Method Of Accurately Executing Read Access And Magnetic Recording/Reproducing Apparatus Therefor, U.S. Pat. No. 4,479,151 to Lia et al., entitled Magnetic Recording Of Digital Signals On A Magnetic Medium, U.S. Pat. No. 4,428,008 to Fawkes, entitled Electronic Switching Circuit For Use In Magnetic Head Drives, U.S. Pat. No. 3,869,714 to Schneider et al., entitled Method And Apparatus For Controlling The Risetime Of A Digital Magnetic Recording Waveform, U.S. Pat. No. 5,485,320 to Vogel et al., entitled Method And Apparatus For Adjusting Asymmetric Recording Signals, U.S. Pat. No. 5,483,390 to Jaffard et al., entitled Device For Switching A Video Tape Recorder Head To Write/Read Mode, U.S. Pat. No. 5,461,517 to Suda et al., entitled Magneto-Resistance Effect Type Of Recording/Reproducing Head, U.S. Pat. No. 5,436,772 to Sekiya et al., entitled Magnetic Recording And Reproducing Apparatus Having Magneto-Resistance Effect Element, U.S. Pat. No. 5,392,172 to Yoshinaga et al., entitled Magnetic Head Circuit Having A Write Current Changeover Circuit With A Clamp Voltage Depending On Write Current For High-Speed Data Transfer, U.S. Pat. No. 5,392,169 to Argyle et al., entitled Electrical Means To Diminish Read-Back Signal Waveform Distortion In Recording Heads, U.S. Pat. No. 5,359,467 to Nakamura, entitled Write Circuit Providing Selective Waveform Correction Based On Recording Density, And Magnetic Recording Apparatus Employing The Write Circuit, U.S. Pat. No. 5,331,479 to Madsen, entitled Capacitor Assisted Low Voltage Write Circuit, and U.S. Pat. No. 5,307,214 to Magnetic Recording Apparatus.

SUMMARY OF THE INVENTION

It is an object of the present invention to provide a technique for controlling the write current of a magnetic disk recording apparatus with a means for minimizing the Barkhausen noise generated on write-read transit to prevent data errors.

According to one aspect of the present invention, a circuit for controlling the write currents of a magnetic disk recording apparatus comprises a read/write circuit for performing a write or read operation according to the read/write mode signal and for supplying a constant write current to a magnetic head in response to a write data in the write mode, a write current adjustment means connected to the read/write circuit for adjusting step by step the amount of the write current supplied to the head under a given control, a timing control circuit for prolonging the read mode of the read/write circuit for a predetermined time on a transit of the mode signal state from the write to the read mode, and a micro controller for controlling the write current adjustment to gradually reduce the amount of the write current for a given time in response to the end of a write gate signal defining write intervals in the write mode.

According to another aspect of the present invention, a method for controlling the write currents of a magnetic disk recording apparatus comprises the steps of prolonging the write mode for a given time after completing data writing on a disk by supplying a constant write current to a head according to data to write, gradually reducing the write current, and cutting off the write current.

The present invention will now be described more specifically with reference to the attached drawings only by way of example, where the same reference numerals are used to represent corresponding constituent parts. It will be self evident to those skilled in this art that various modifications may be made to the embodiments shown in the specification and drawings without departing the gist of the present invention. Additionally omitted are the descriptions of conventional parts which may cause misunderstanding of the spirit of the invention.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 illustrates the waveforms of a writing operation timing according to a write control sequence used in HDDs;

FIGS. 2A and 2B illustrate partial cross-sectional views of a thin film head core to show the changes of the magnetic polarity arrangement before and after cutting off the write current;

DETAILED DESCRIPTION OF PREFERRED EMBODIMENTS

Figure 3:
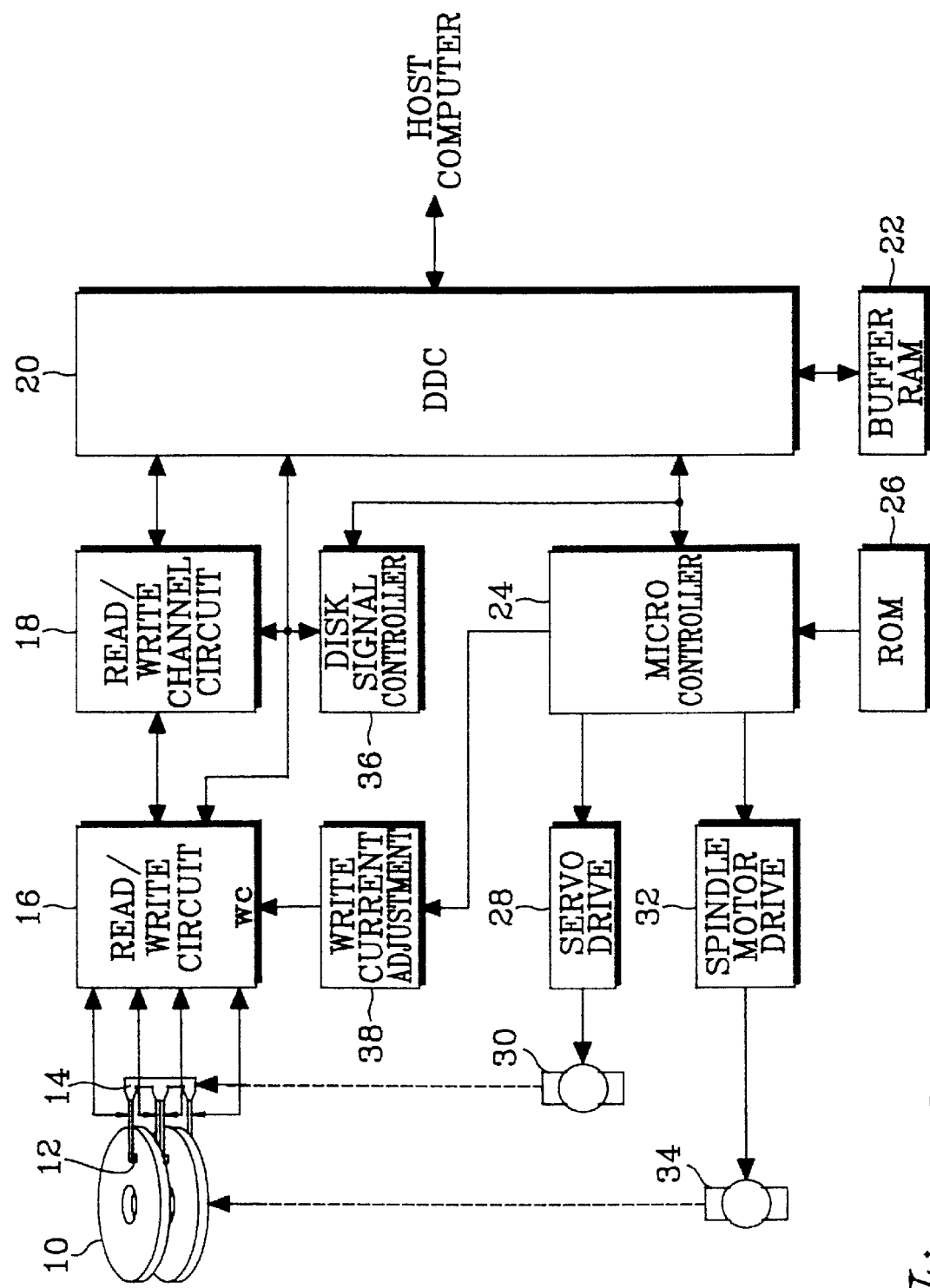
FIG. 3 is a block diagram illustrating the construction of an HDD according to the present invention.

Describing the structure of an inventive HDD with reference to FIG. 3, each side surface of two disks is associated with one of four magnetic heads. A micro controller 24 is provided to control a write current adjustment 38 step by step. Examples of this kind of technology are disclosed in Korean Patent Application Nos. 91-2820 and 95-53518, respectively entitled "Circuit For Controlling the Write Current of A Magnetic Disk Recording Apparatus" and "Circuit for Controlling the Write Current of A Magnetic Disk Recording Apparatus and Method for Optimizing it". The former discloses a means for controlling the write current according to the data zones of the disks by employing a digital to analog converter (DAC) while the latter discloses a method comprising the steps of determining the optimum write current control value to suit the characteristics of the heads and disks, and controlling the write current in response to pulse width modulated signal (PWM signals) with duty cycles corresponding to the predetermined write current control values.

In FIG. 3, there are shown two magnetic disks 10 stacked on a single spindle driven by a spindle motor 34. Both side surfaces of each disk 10 are each associated with one of four magnetic heads 12, which are respectively supported by support arms of a E-block assembly 14 connected to a rotary voice coil actuator 30.

The heads 12 are connected with a read/write circuit 16, which preamplifiers the signals picked up by the heads from the disks to generate analog read signals supplied to a read/write channel circuit 18, and which supplies the write currents to the heads 12 to write encoded recording data from the read/write channel circuit 18 onto the disks 10. The read/write circuit is generally comprised of a one chip IC, examples of which are SSI 32R211OR/2211R/2212R manufactured by Silicon Systems Company of the U.S.A. Such a read/write circuit has a write current control terminal WC provided to externally control the write current, wherein the write current is determined by the resistance value of an external resistor connected to the write current control terminal. The read/write circuit 16 supplies the write current corresponding to the current amount of the write current control terminal WC to a head 12 to write data onto the disk 10, The read/write channel circuit 18 detects a read signal delivered by the read/write circuit 16 to decode the data pulse supplied to a disk data controller (DDC) 20, and encodes write data supplied from the DDC 20 to apply it to the read/write circuit 16.

The DDC 20 is controlled by a micro controller 24 so as to deliver data from a host computer such as personal computer through the read/write channel circuit 18 and the read/write circuit 16 to the disks 10, or vice versa. In addition, the DDC 20 interfaces the communications between the host computer and the micro controller 24. Also provided is a buffer RAM 22 to temporarily store data transferred between the host computer and the micro controller 24 and the read/write channel circuit 18.

The micro controller 24 controls the DDC 20 in response to a read or write command received from the host computer, as well as searching and pursuing tracks. It also controls a write current adjustment circuit 38 to adjust the write current supplied from the, read/write circuit 16 to the head 10. It generates PWM signals with duty cycles corresponding to respective predetermined write current control values in order to determine the write currents. The write current adjustment 38 is to adjust the current of the write current control terminal WC of the read/write circuit 16 according to the duty cycles of the PWM signals of the micro controller 24. A ROM 26 is provided to store the execution program of the micro controller 24 together with various set values.

A servo drive 28 generates a drive current for driving an actuator 30 in response to a control signal that is provided by the micro controller 24 to control the positions of the heads 12. The actuator 30 moves the heads 12 over the disks 10 according to the level and direction of the drive current. A spindle motor drive 32 drives a spindle motor 34 to rotate the disks 10 under the control of the micro controller 24. A disk signal controller 36 decodes servo data of the read data output from the read/write channel circuit 18 to supply it to the micro controller 24, and generates various control signals necessary for the read/write operation and supplied to the read/write circuit 16 and the read/write channel circuit 18 under the control of the DDC 20 and the micro controller 24. The disk signal controller 36 usually comprises an ASIC (Application Specific Integrated Circuit) designed to suit an HDD.

Figure 4:
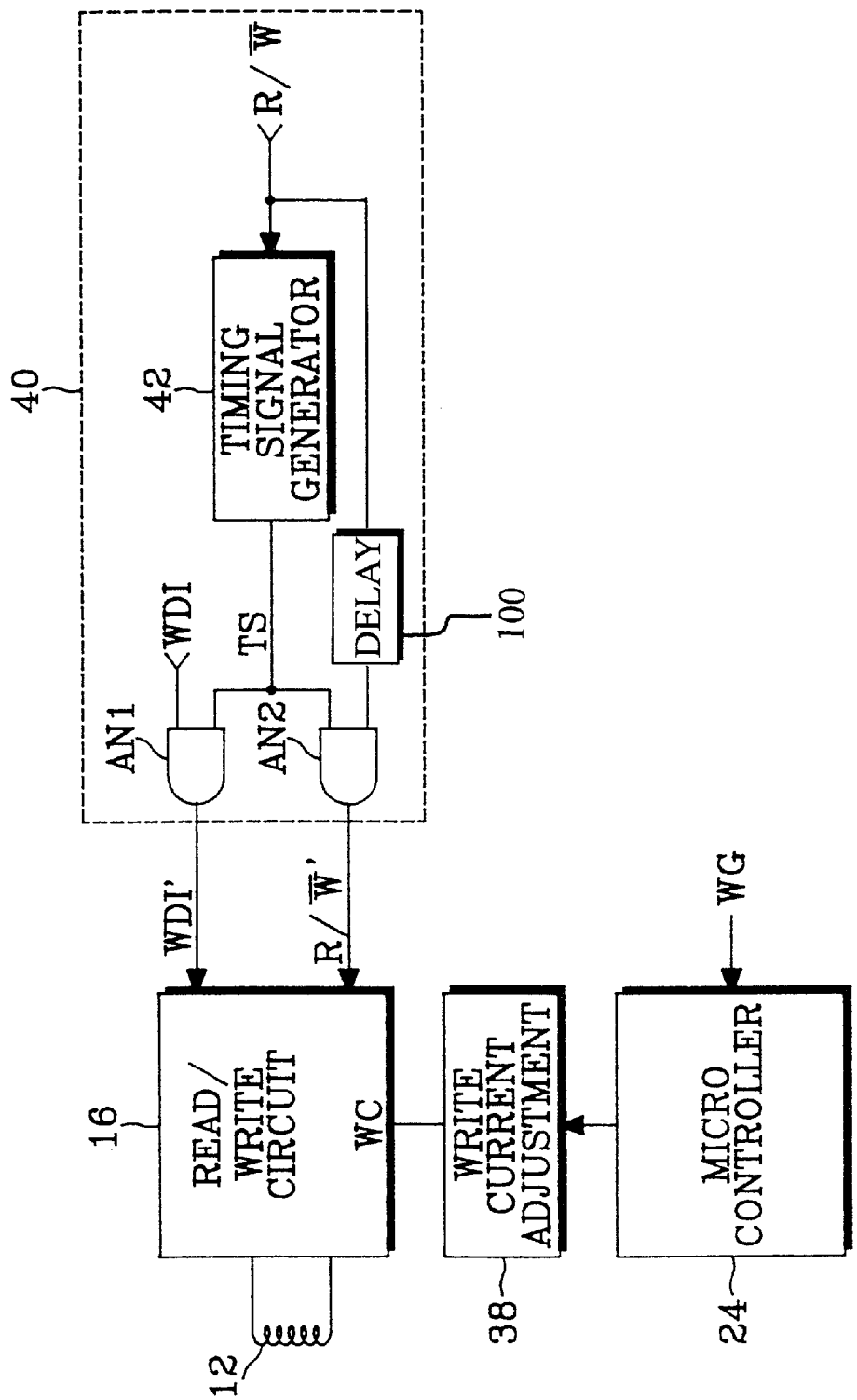
FIG. 4 is block diagram of a circuit for controlling the write current according to the present invention.
Figure 5:
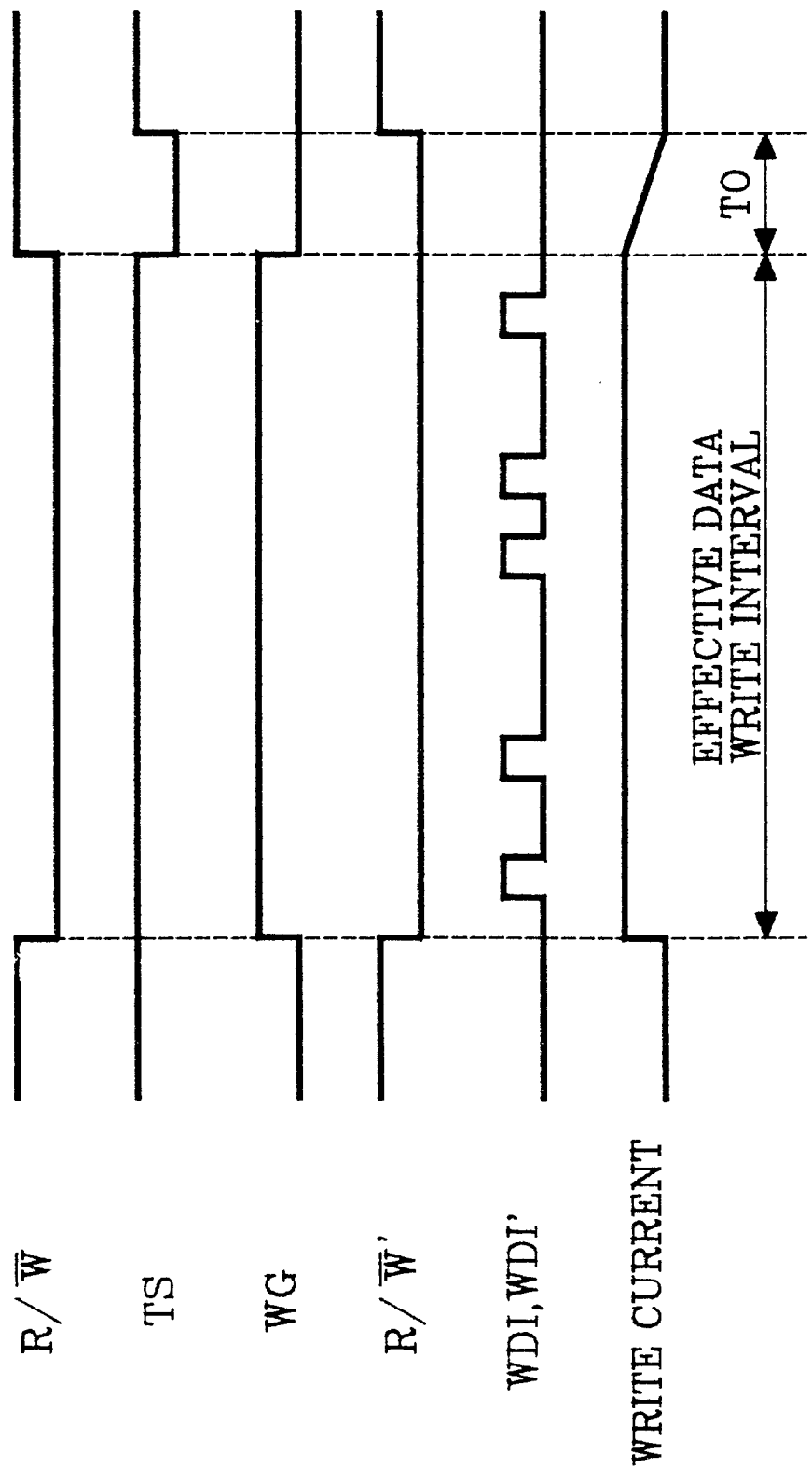
FIG. 5 illustrates the waveforms of a writing operation timing according to the present invention.

Referring to FIG. 4 for illustrating a circuit for controlling the write current according to the present invention, the micro controller 24 is programmed to control the write current adjustment 38 so as to gradually reduce the write current in response to the end of a write gate signal WG. Also provided is a timing control circuit 40 comprising a timing signal generator 42 and AND gates AN1 and AN2 and a delay 100. The timing signal generator 42 is to generate a timing signal TS with a pulse width prolonged for a given time To when the state of the read/write mode signal R/W generated from DDC 20 transits from the read mode to the write mode, as shown in FIG. 5. At this time, the AND gate AN1 logically multiplies the write data WDI supplied from the read/write circuit 16 by the timing signal TS, supplying it to the read/write circuit 16, while the AND gate AN2 logically multiplies the read/write mode signal R/W, delayed by the delay 100, by the timing signal TS, supplying it to the read/write circuit 16.

When the read/write mode signal R/W becomes "low" as shown in FIG. 5, the read/write circuit 16 goes to the read mode. In this case, the write gate signal WG generated by the DDC 20 is kept "high" and is supplied to the micro controller 24 for the effective data write interval as shown in FIG. 5. Accordingly, the read/write circuit 16 supplies the constant write current adjusted by the write current adjustment circuit 38 to the head 12 according to the write data WDI.

Alternatively, when the state of the read/write mode signal R/W transits from the write mode to the read mode, the timing signal generator 42 generates the timing signal TS as shown in FIG. 5. Accordingly, the read/write mode signal R/W supplied from the AND gate AN2 to the read/write circuit 16 is prolonged by the time To compared to the original read/write mode signal R/W, as shown in FIG. 5. At the same time, the micro controller 24 controls the write current adjustment circuit 38 to gradually reduce the write current for the time To in response to the end of the write gate signal WG. Hence, the head 12 is kept stabilized even during the read-write transit. The time To maintain the write mode must be determined so as to have the value necessary for stabilizing the head 12.

Figure 6:
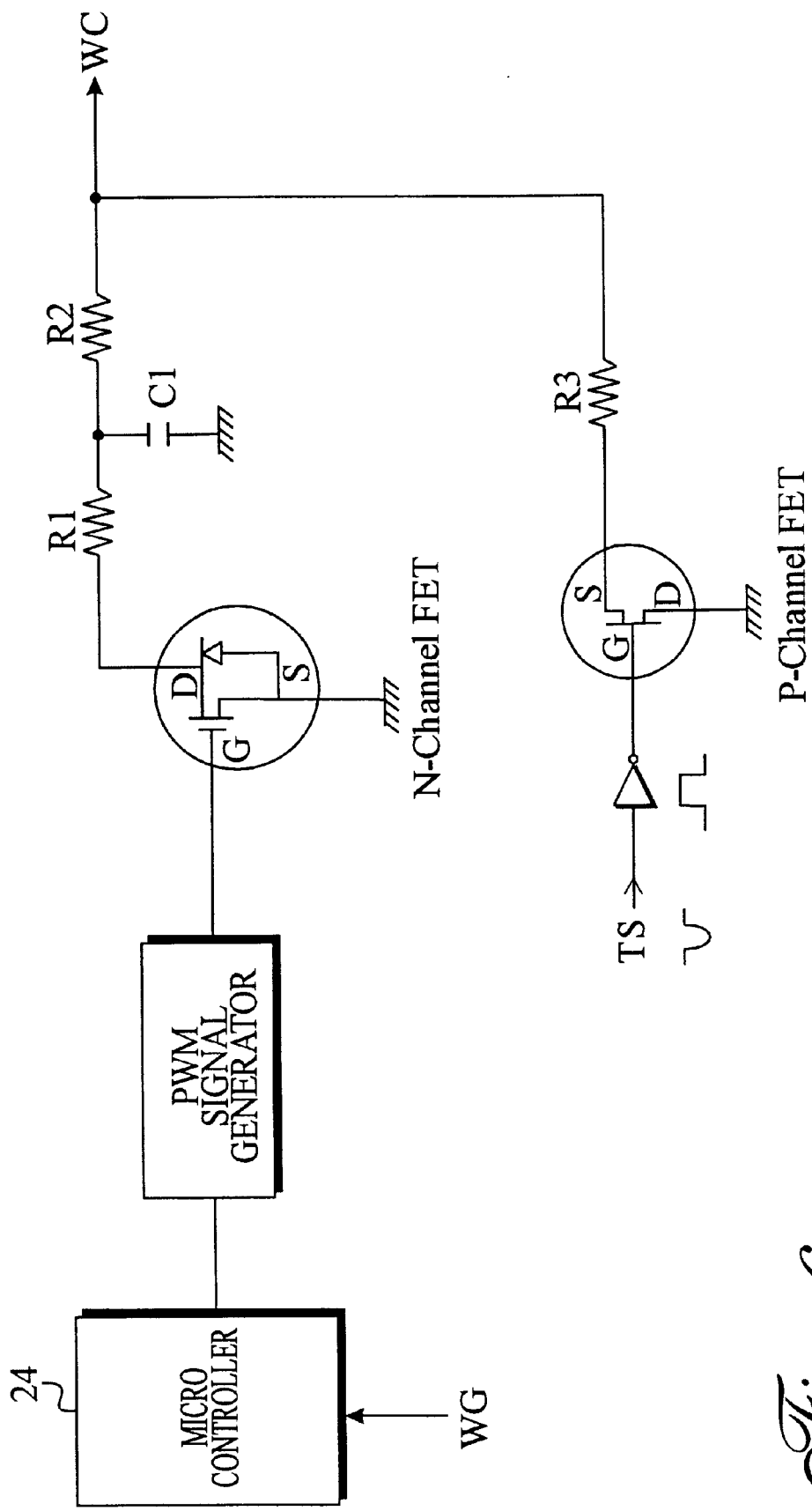
FIG. 6 illustrates the write current adjustment circuit 38.

Regarding the write current adjustment circuit as shown in FIG. 6, if a PWM generator transmits a modulated pulse width signal to the N-channel FET in response to data from the microcontroller 24, thereby to charge a constant voltage by the resistor R1 and the capacitor C1, the current flowing through WC is adjusted by the values of the resistors R2 and R3. The P-channel FET is operated such that the resistor R3 is connected to ground GND at the time of the normal state. At this time, if the TS is in the active low state, the circuit the Resistor R3 to ground is opened.

Figure 7:
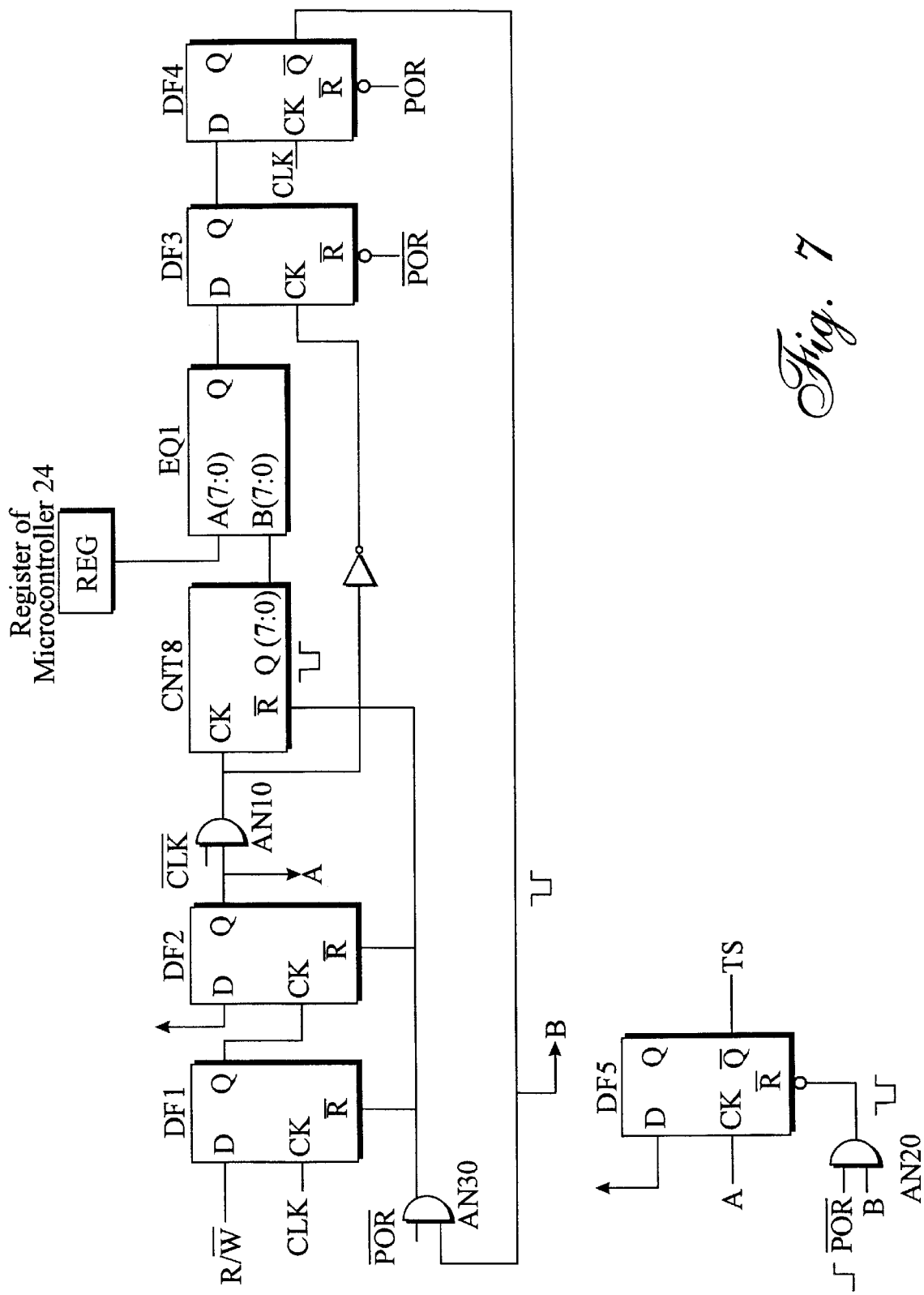
FIG. 7 illustrates the timing signal generating circuit 42.

Regarding the timing signal generating circuit as shown in FIG. 7, a R/W signal is inputted to D terminal of the D flip-flop DF1 and a Q signal is outputted by the system clock "CLK". And then, if the DF2 is operated by a rising edge, so as to hereby output an A signal, the $\overline{CLK}$ enables 8 bits of the counter CNT 8 through the AND gate 10 in a high state of the A signal. At the time of being consistent with a set value of the register, the output Q of the equalizer EQ1 is transmitted to the D input of the flip-flop DF3; the flip-flop DF3 retransmits the output Q to the flip-flop DF4 and then transmits the output of $\overline{Q}$ to the AND gate AN30, and then resets the flip-flops DF1, DF2 and the counter CNT8. At this time, the A and B signals are transmitted to the flip-flop DF5, so as to generate "TS" as shown in the timing signal generating circuit (42) and delay the R/W signal termination. And then, the delayed R/W is inputted to the AND gate AN2 within the block (40) of FIG. 4, thereby generating the R/W signal.

Of course, the inventive circuit may be used in FDDs. It will be self-evident to those skilled in this art that various modifications may be made to the embodiments described in the specification and the drawings without departing from the scope of the present invention.

What is claimed is:

1. A circuit for controlling the write currents of a magnetic disk recording apparatus comprising:

a read/write circuit for performing a write or read operation according to a read/write mode signal and for applying a constant write current to a magnetic head in response to a write data in the write mode;

a write current adjustment circuit connected to said read/write circuit for adjusting step by step the amount of the write current applied to the head under a given control, the write current adjustment circuit comprising a pulse width modulation (PWM) signal generator having an input and an output, and further comprising first and second field effect transistors (FETs) and first and second and third resistors and a capacitor; the output of the PWM signal generator being connected to a gate of the first FET and a source of the first FET being grounded and a drain of said first FET being connected to one end of the first resistor, the other end of the first resistor being connected to a junction point of one end of the capacitor and one end of the second resistor, the other end of the second resistor being connected to the read/write circuit, the other end of the capacitor being grounded, a drain of the second FET being grounded and a source of the second FET being connected to one end of the third resistor, the other end of the third resistor being connected to the read/write circuit;

a timing control circuit for prolonging the read mode of said read/write circuit for a predetermined time on a transit of the mode signal state from the write to the read mode, the timing control circuit having one output being connected to a gate of the second FET via an inverter; and a micro controller for controlling said write current adjustment circuit to gradually reduce the amount of the write current for a given time in response to the end of a write gate signal defining write intervals in the write mode, the micro controller being connected to the input of the PWM signal generator of the write current adjustment circuit.

2. A circuit as defined in claim 1, wherein said timing control circuit further includes:

a timing signal generator for generating a timing signal with a pulse width prolonged for a given time when the state of said read/write mode signal transits from the write mode to the read mode; and a gate means for gating said read/write mode signal and write data with said timing signal to apply the output to said read/write circuit.

3. A circuit as defined in claim 2, wherein said gate means includes AND gates for logically multiplying said read/write mode signal and write data respectively with said timing signal.

4. A circuit as defined in claim 2, the timing signal generator comprising a first D-type flip flop having an output connected to an input of a second D-type flip flop;

an AND gate having one input connected to an output of the second flip flop;

a counter having an input connected to an output of the first AND gate;

an equalizer having an input connected an output of the counter;

a third D-type flip flop having an input connected to an output of the equalizer and having another input connected to the output of the first AND gate via an inverter;

a fourth D-type flip flop having an input connected to an output of the third flip flop;

a second AND gate having one input connected to an output of the fourth flip flop and having an output connected to reset inputs of said first and second flip flops and said counter;

a fifth D-type flip flop having an input connected to the output of the second flip flop and having an output connected to the gate of the second FET via an inverter; and a third AND gate having one input connected to the output of the fourth flip flop and having an output connected to a reset input of the fifth flip flop.

* * * * *